United States Patent [19]

Liu

[11] 4,140,826
[45] Feb. 20, 1979

[54] RETICULATED WEB STRUCTURES
[75] Inventor: Chia-Seng Liu, Newark, Del.
[73] Assignee: Hercules Incorporated, Wilmington, Del.
[21] Appl. No.: 741,098
[22] Filed: Nov. 11, 1976

Related U.S. Application Data

[63] Continuation-in-part of Ser. No. 675,022, Apr. 8, 1976, abandoned.
[51] Int. Cl.² .......................... B32B 5/12; B29D 7/24; D02G 3/00
[52] U.S. Cl. .................................. 428/113; 264/289; 428/132; 428/220; 428/397; 428/910
[58] Field of Search .................. 264/289, DIG. 73, 81; 428/113, 132, 220, 338, 339, 397, 910

[56] References Cited
U.S. PATENT DOCUMENTS

| | | | |
|---|---|---|---|
| 3,253,072 | 5/1966 | Scragg et al. | 264/288 |
| 3,441,638 | 4/1969 | Patchell et al. | 264/289 |
| 3,632,716 | 1/1972 | Fairbanks | 264/289 |
| 3,666,609 | 5/1972 | Kalwaites et al. | 264/289 |
| 3,954,933 | 5/1976 | Rasmussen | 264/289 |

Primary Examiner—William R. Dixon, Jr.
Attorney, Agent, or Firm—James W. Peterson

[57] ABSTRACT

It has been found that reticulated web structures having a uniform thickness, soft hand and high strength-to-weight ratio comprising a first set of oriented substantially parallel flat filaments running in the machine direction intersecting a second set of oriented substantially parallel flat filaments running in the cross-machine direction, where the said filaments all have a rectangular cross-section, with the width of the filaments being at least 1.5 times their thickness, the filament intersections being biaxially oriented and the first set of filaments running in the machine direction being perpendicular to the second set of filaments running in the cross-machine direction, can be prepared by drawing from about 3 to 6 times in both the machine and cross-machine directions a thermoplastic polymer film having a thickness of from about 3 to 25 mils and a pattern of round openings aligned uniformly longitudinally and transversely in a square pattern while heating said film at an elevated temperature appropriate to obtain orientation of the filaments along their long axis and in both directions at their intersections, provided said round openings in said film are situated such that the distance between the circumference of any opening and the circumference of any neighboring opening at the narrowest point is at least 1.5 times the thickness of the film and the ratio of the distance between the circumference of any opening and the circumference of any neighboring opening at the narrowest point to the diameter of the opening is from about 1 to 4 to about 1.5 to 1.

6 Claims, 3 Drawing Figures

RETICULATED WEB STRUCTURES

This is a continuation-in-part of U.S. Patent Application Ser. No. 675,022 filed Apr. 8, 1976 now abandoned.

This invention relates to thermoplastic reticulated web structures having a soft hand and high strength and their process of preparation. More particularly, this invention relates to thermoplastic reticulated web structures having a uniform thickness across the web comprising a first set of oriented substantially parallel flat filaments running in the machine direction intersecting a second set of oriented subsantially parallel flat filaments running in the cross-machine direction, where the said filaments all have a substantially rectangular cross-section, with the width of the filaments being at least 1.5 times their thickness and the filament intersections being biaxially oriented and having a thickness substantially equal to the thickness of the filaments and the first set of filaments being perpendicular to the second set of filaments; and their process of preparation.

The term "oriented" or "orientation" as used throughout this specification and claims means "molecularly oriented" or "molecular orientation".

It is known from the prior art to make thermoplastic reticulated web structures. For example, U.S. Pat. No. 3,386,876 discloses a thermoplastic reticulated web structure having substantially round or oval filaments and unoriented filament intersections which are much thicker than the connecting filaments. Because of the nonuniform thickness across the web structure and its low strength due to unoriented thick intersections it is not as desirable for use in reinforcing, such as in reinforcing paper sheets. Another type of thermoplastic recticulated web structure is disclosed in U.S. Pat. No. 3,666,609. This structure differs from the structure of this invention particularly in having filaments with round or oval cross-sections. The round or oval cross-section of the filaments contribute to an undesirable stiffness, giving the structures a stiffer hand than the structures of this invention. Still another type of thermoplastic reticulated web structure is disclosed in U.S. Pat. No. 3,365,352. This structure differs from the structure of this invention particularly in having the filaments intersect in diagonal directions and wherein both the intersections and filaments are biaxially oriented. Because of the diagonal alignment of the filaments and its low strength it is not as desirable for use in reinforcing.

The relative stiffness or conversely softness (sometimes referred to as soft hand) of a reticulated web structure is primarily the result of the cross-sectional configuration of the filaments. For a given basic weight and given spacing between filaments the softness of a given thermoplastic reticulated web structure may be judged by the flexural rigidity of its filaments; the smaller the flexural rigidity, the softer the web. The flexural rigidity (D) of a rectangular filament may be expressed by the following formula:

$$D = \frac{wt_1^3}{12} E$$

where w is the width of the filament, $t_1$ is the thickness of the filament and E is the tensile modulus of the material. The above formula clearly indicates that the filament thickness has a stronger influence on softness than the filament width. Thus, a web with a rectangular filament cross-section with the width greater than thickness will be softer than one with a circular or square filament cross-section of the same polymeric material and weight.

It is an object of this invention to provide a reticulated web structure of thermoplastic polymer material having a soft hand and a high strength-to-weight ratio.

It is a further object of this invention to provide a reticulated web structure of thermoplastic polymer material which comprises a first set of oriented substantially parallel flat filaments running in the machine direction intersecting a second set of oriented substantially parallel flat filaments running in the cross-machine direction at oriented intersections, where the said first set of filaments are perpendicular to the said second set of filaments.

It is a further object of this invention to provide a reticulated web structure having a uniform thickness across the web.

It is a further object of this invention to provide a reticulated web structure where all the filaments have a substantially rectangular cross-section with the width of the filaments being at least 1.5 times their thickness.

It is still a further object of this invention to provide a process for preparing reticulated web structures wherein a film of thermoplastic polymer material having a square pattern of round openings is biaxially drawn at elevated temperatures.

It has now been discovered that the above noted and other objects and advantages can be provided if a film of thermoplastic polymer material having a certain regular patern of round openings is biaxially drawn at elevated temperatures. In order to obtain the unique reticulated web structure of this invention having a soft hand and a high strength/weight ratio certain critical procedures must be followed:

(1) The thermoplastic polymer film from which the reticulated web structure is formed will have an initial thickness (i.e. before drawing) of from about 3 mils to about 25 mils.

(2) The pattern of perforated round openings (i.e. holes) in the thermoplastic polymer film from which the reticulated web structure is formed will be in a square pattern, so that the openings will be aligned uniformly longitudinally and transversely (i.e. in the machine and cross-machine directions).

(3) The perforated openings (i.e. holes) in the thermoplastic polymer film from which the reticulated web structure is formed will be substantially round and of equal size, the distance between the circumference (i.e. edge) of any hole and the circumference of any neighboring hole at the narrowest point will be at least 1.5 times, most preferably 2 to 15 times, the thickness of the film and the ratio of the distance between the circumference of any hole and the circumference of any neighboring hole at the narrowest point to the diameter of the holes will be from about 1:4 to about 1.5:1, most preferably from about 1:3 to about 1:1.

(4) The thermoplastic polymer film having perforated round openings from which the reticulated web structure is formed, will be drawn about 3 to 6 times in both the machine and cross-machine directions at an elevated temperature appropriate to obtain orientation of the filaments along their long axis and at the intersections in both directions.

The specific elevated temperatures at which the perforated film should be drawn to obtain the desired orientation will depend upon the specific polymer from which the film is made. For example, polypropylene film will be drawn at a temperature of from about 100° C. to about 140° C. The exact temperature required for other polymers will be apparent to those skilled in the art.

The sequence in which the film is drawn is not critical.

The machine direction draw may be carried out before, after, or simultaneous with the transverse (i.e. cross-machine) direction draw. For good process continuity in commercial production, transverse direction draw using a tenter followed by machine direction drawn on a differential speed multi-roll stretcher is preferred.

As mentioned above, the size, shape and spacing of the openings in the thermoplastic polymer film is critical to obtaining a reticulated web structure having a soft hand and a high strength-to-weight ratio. Accordingly, care must be taken in forming the openings. There are many ways in which the openings can be formed; as for example by punching, drilling, molding, etc. The best method to use in each specific case will be obvious to those skilled in the art.

The starting polymeric material which may be used to produce the reticulated web structure of this invention will be any readily orientable thermoplastic polymer material; such as the polyolefins, polyesters, polyamides, ethylene--vinyl acetate copolymers, etc. The most preferred starting materials are the homopolymers and copolymers of olefins because of their low cost and ease of handling.

The present invention will become more apparent when taken in conjunction with the accompanying drawings wherein.

Figure 1:
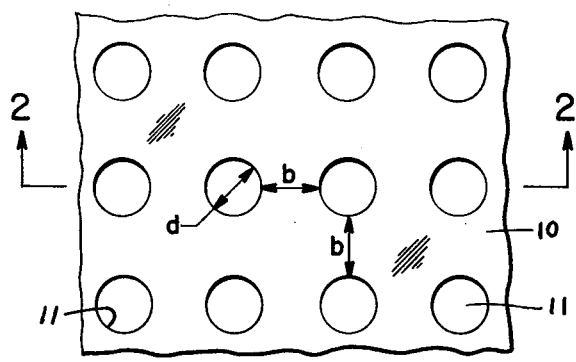
FIG. 1 is a top view of a portion of an undrawn thermoplastic polymer film which has been perforated in accordance with the present invention preparatory to drawing the same.

For a more detailed description, reference is made to FIG. 1 of the drawing which illustrates a portion of an undrawn film 10 of thermoplastic polymer material having a series of punched round openings 11. The openings 11 are all of equal diameter d, have equally spaced distances b at the narrowest point between the circumferences of neighboring openings and are uniformly spaced longitudinally and transversely in a square pattern.

Figure 2:
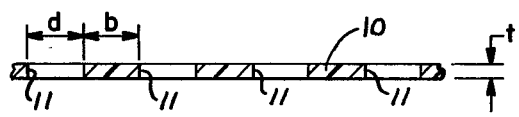
FIG. 2 is a cross-sectional view along line 2—2 of FIG. 1.

The cross-sectional view of the undrawn film in FIG. 2 shows the thickness t of the film 10 in relation to the diameter d of the openings 11 and the distance b at the narrowest point between the circumferences of neighboring openings.

Figure 3:
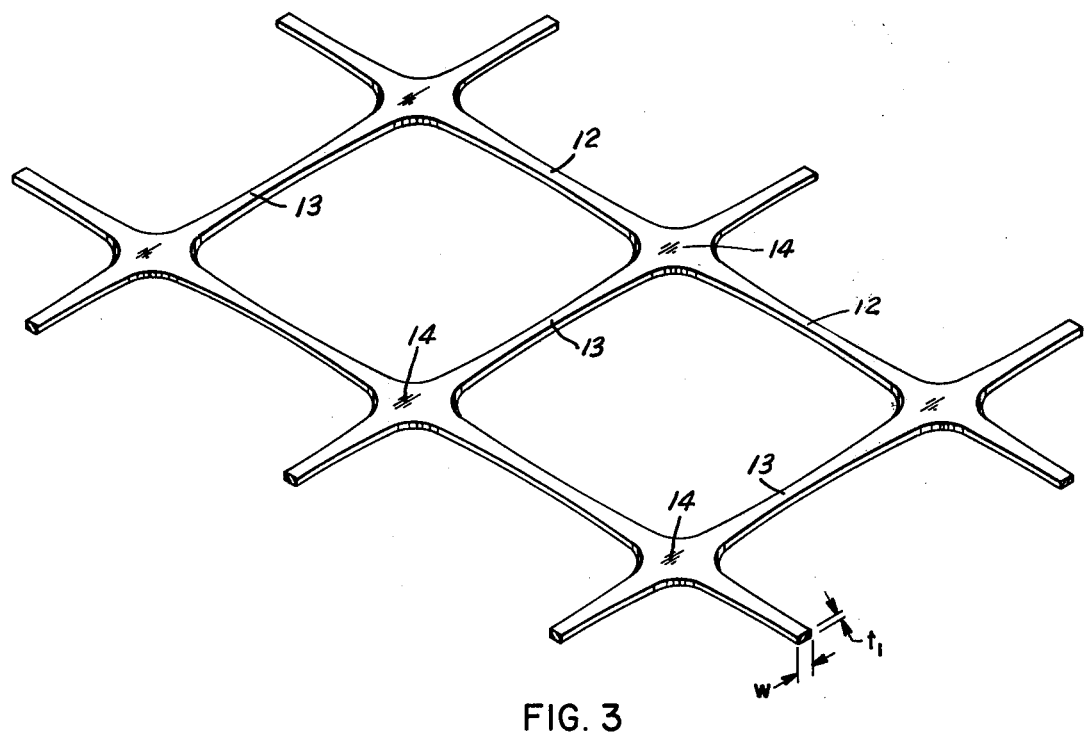
FIG. 3 is an enlarged perspective view of a portion of the reticulated web structure of this invention.

The perspective view of the reticulated web structure of this invention in FIG. 3 shows the sets of oriented substantially parallel flat filaments 12 and 13 running in the machine and cross-machine directions respectively intersecting at biaxially oriented intersections 14, with the filaments 12 and 13 perpendicular one to the other. Each of the filaments 12 and 13 have a substantially rectangular cross-section with the width w being at least 1.5 times its thickness $t_1$.

Because of its soft hand and high strength/weight ratio, the reticulated web structures of this invention can be used in a variety of applications, such as for example in reinforcing tissue paper, film, foam or nonwoven fabrics.

The following examples are presented to illustrate the unique reticulated web structures of this invention and their process of production.

EXAMPLE 1

A 10 mil thick cast film of ethylene-propylene copolymer, containing approximately 5% of units derived from ethylene, provided with a uniform square pattern of round holes each having a 0.045" diameter, positioned so that the distance between the circumference (i.e. edges) of neighboring holes is 0.022" and the width-to-thickness ratio at the narrowest portion between two neighboring holes is 2.2, is stretched in a tenter frame 4.5 times in the cross-machine in an oven at a temperature of 110° C. and then stretched on a differential speed multi-roll stretcher 4.5 times in the machine direction with the rolls heated to a temperature of 100° C. The resulting reticulated web structure has approximately 3.5 filaments per inch running in both machine and cross-machine directions and a basic weight of 0.25 oz./yd.$^2$. The filaments are approximately 0.012" wide, 0.004" thick and rectangular in cross-section. The resulting structure is flat and of relatively uniform thickness across the web. It has a soft hand, a tensile strength of 6.7 lbs./in. in the machine direction, 6.1 lbs./in. in the cross-machine direction and a tongue tear of approximately 1 lb. in both directions. Because of its soft hand and high strength/weight ratio this reticulated web structure is well studied for reinforcing plastic films.

EXAMPLE 2

A 5 mil thick cast film of ethylene-propylene copolymer, containing approximately 5% of units derived from ethylene, provided with a uniform square pattern of round holes each having a 0.045" diameter, positioned so that the distance between the circumferences (i.e. edges) of neighboring holes is 0.022" and the width-to-thickness ratio at the narrowest portion between two neighboring holes is 4.4, is first stretched on a differential speed multi-roll stretcher 4.1 times in the machine direction with the rolls heated to 100° C. and then stretched in a tenter frame 5 times in the cross-machine direction in an oven at a temperature of 110° C. The resulting reticulated web structure has approximately 3.7 filaments per inch in the machine direction and 3 filaments per inch in the cross-machine direction and a basic weight of 0.13 oz./yd.$^2$. The filaments are rectangular in cross-section with a width of 0.012" and a thickness of 0.002". The resulting structure is flat and uniform in thickness. It has a soft hand, a tensile strength of 3.3 lbs./inch in the machine direction, 3.4 lbs./inch in the cross-machine direction and a tongue tear of approximately 0.6 lbs. in both directions. The reticulated web structure is well suited for reinforcing tissue paper.

EXAMPLE 3

The reticulated web structure described in Example 2 is compared to commercial web structures made from the same copolymer and having similar basis weight. The physical properties including relative stiffness (i.e. flexural rigidity, determined using the formula discussed above divided by the tensile modulus E times the number of filaments per inch) are recited in Table I.

Thus, the relative stiffness is defined as $wt_1^3/12$ times the number of filaments per inch.

TABLE I

| Reticulated Web Structure | Weight oz/yd² | Filament Count per inch | | Tensile Strength (lbs./inch) | | Tongue Tear lbs. | | Thickness (mils) | | Relative Stiffness (mils 4/in.) |
|---|---|---|---|---|---|---|---|---|---|---|
| | | MD | CMD | MD | CMD | MD | CMD | Filaments | Intersections | |
| ªWeb of Example 2 | 0.133 | 3.7 | 3 | 3.3 | 3.4 | 0.6 | 0.6 | 2.0 | 2.0 | 30 |
| ᵇWeb with filaments of square cross-section | 0.160 | 3 | 5 | 2.0 | 7.2 | 0.6 | 0.5 | 6.8 | 5.0 | 525 |
| ᶜWeb with round filaments | 0.242 | 3.5 | 3 | 5.2 | 5.7 | 2.0 | 1.5 | 7.4 | 11.0 | 515 |

EXAMPLE 4

A 5 mil thick cast film of the ethylene-propylene copolymer described in Example 2, provided with the same pattern of round holes having the same diameter and positioned at the same distance between the circumferences as described in Example 2 is first stretched on a differential speed multi-roll stretcher 4.7 times in the machine direction with the rolls heated to 125° C. and then stretched in a tenter frame 5 times in the cross-machine direction in an oven at a temperature of 130° C. The resulting reticulated web structure has approximately 3.5 filaments per inch running in both the machine and cross-machine directions and a basic weight of 0.11 oz./yd.². The filaments are rectangular in cross-section with a width of 0.012" and a thickness of 0.002". The resulting structure is flat and uniform in thickness with a soft hand.

The thus prepared net with the rectangular configuration of filaments is compared with a net having the same basic weight, essentially the same number and size openings, and shape of filaments except the filaments run diagonally. The modulus, tensile strength and tensile elongation of the two types of nets is recited in Table II.

TABLE II

| Net | Modulus-Machine Direction (lb./in. at 4% elongation) | Tensile Strength Machine Direction (lb./in.) | Tensile Elongation Machine Direction % |
|---|---|---|---|
| Rectangular | 3.5 | 2.4 | 35 |
| Diagonal | 1.8 | 0.9 | 18 |

What I claim and desire to protect by Letters Patent is:

1. A thermoplastic reticulated web structure having a uniform thickness, comprising a first set of substantially parallel flat filaments running the the machine direction intersecting a second set of substantially parallel flat filaments running in the cross-machine direction, said filaments all being uniaxially oriented along their respective longitudinal axes and having a substantially rectangular cross-section with the width of the filaments being at least 1.5 times their thickness and the filament intersections being biaxially oriented with the filaments of the first set being perpendicular to the filaments of the second set at the intersections.

2. The thermoplastic reticulated web structure of claim 1 wherein the thermoplastic is a polyolefin.

3. The reticulated web structure of claim 2 wherein the polyolefin is an ethylene-propylene copolymer.

4. A process for producing a thermoplastic reticulated web structure comprising:
   forming in a thermoplastic polymer film having a thickness of from about 3 mils to about 25 mils a pattern of round openings aligned uniformly longitudinally and transversely in a square pattern, the openings in said film being situated such that the distance between the circumference of any openings and the circumference of any neighboring opening at the narrowest point is at least 1.5 times the thickness of the film and the ratio of the distance between the circumference of any opening and the circumference of any neighboring opening at the narrowest point to the diameter of the openings is from 1 to 4 to about 1.5 to 1;
   drawing said film from about 3 to 6 times in both machine and cross-machine directions at an elevated temperature to form a structural having a first set of substantially parallel flat filaments of rectangular cross-section running in the machine direction intersecting a second set of substantially parallel flat filaments of rectangular cross-section running in the cross-machine direction, the filaments each being oriented uniaxially along its longitudinal axis and the intersections of said filaments being biaxially oriented.

5. The process of claim 4 wherein the thermoplastic polymer film is first drawn in the cross-machine direction using a tenter and then drawn in the machine direction using a differential speed multi-roll stretcher.

6. The process of claim 5 wherein the thermoplastic polymer film is drawn an equal amount in both the machine and cross-machine directions.

* * * * *

UNITED STATES PATENT AND TRADEMARK OFFICE
CERTIFICATE OF CORRECTION

PATENT NO. : 4,140,826
DATED : February 20, 1979
INVENTOR(S) : Chia-Seng Liu

It is certified that error appears in the above-identified patent and that said Letters Patent are hereby corrected as shown below:

Col. 4, Line 17, insert "direction" after --cross-machine.--

Col. 4, Line 24, reads "ox." should read -- oz. --.

Col. 4, Line 32, reads "Studied" should read -- suited--.

Col. 4, Line 67, insert ")" after above.

Col. 4, Line 68, delete ")" after inch.

In the claims, Claim 1, Col. 5, Line 52, " running the the machine direction" should read-- running in the machine direction --.

Signed and Sealed this

Twenty-sixth Day of June 1979

[SEAL]

Attest:

RUTH C. MASON
Attesting Officer

DONALD W. BANNER
Commissioner of Patents and Trademarks